United States Patent [19]

Hopper

[11] Patent Number: 5,629,741
[45] Date of Patent: May 13, 1997

[54] LATERAL IMAGE REVERSAL OF DIGITAL TELEVISION SIGNALS

[75] Inventor: Robert W. Hopper, Ipswich, England

[73] Assignee: British Telecommunications public limited company, London, England

[21] Appl. No.: 828,987

[22] PCT Filed: Aug. 9, 1990

[86] PCT No.: PCT/GB90/01253

§ 371 Date: Feb. 5, 1992

§ 102(e) Date: Feb. 5, 1992

[87] PCT Pub. No.: WO91/03132

PCT Pub. Date: Mar. 7, 1991

[30] Foreign Application Priority Data

Aug. 15, 1989 [GB] United Kingdom ............... 8918584

[51] Int. Cl.$^6$ .................................................. H04N 9/74
[52] U.S. Cl. ........................... 348/578; 348/588; 348/15; 379/98
[58] Field of Search .................... 358/11, 22, 160, 358/180, 182, 85, 183; 379/53, 98, 54; 348/12–15, 578, 583, 584, 588; H04N 9/12, 9/137, 9/74

[56] References Cited

U.S. PATENT DOCUMENTS

| | | | |
|---|---|---|---|
| 4,220,965 | 9/1980 | Heitmann et al. | 358/22 |
| 4,689,660 | 8/1987 | Kashigi | 358/22 |
| 4,700,228 | 10/1987 | Heerah | 358/22 |
| 4,715,059 | 12/1987 | Cooper-Hart | 379/53 |
| 5,036,390 | 7/1991 | Masunaga | 379/53 |

FOREIGN PATENT DOCUMENTS

| | | | |
|---|---|---|---|
| 158182 | 7/1984 | Japan | H04N 7/14 |
| 67888 | 7/1990 | Japan | H04N 7/14 |
| 192380 | 7/1990 | Japan | H04N 7/140 |
| 3-234190 | 8/1990 | Japan | H04N 7/14 |

OTHER PUBLICATIONS

Viewphone, Tele Conference. The Business Communications Magazine, vol. 9, No. 4., Nov. 90.

*Primary Examiner*—Glenton B. Burgess
*Attorney, Agent, or Firm*—Nixon & Vanderhye P.C.

[57] ABSTRACT

Each line of a television signal has a sequence of interleaved luminance and chrominance samples according to a given format ($Y_oU_oY_1V_o$ etc.) which are written into a one line store using a first address sequence and then read out using a second address sequence such that the luminance samples are in reverse order, (and likewise the chrominance); however their interleaving conforms to the given format. The second address sequence is used also for writing in the next incoming line, which is then read out using the first sequence, the two sequences alternating throughout a field period. The technique is especially useful in videotelephony and videoconferencing.

13 Claims, 4 Drawing Sheets

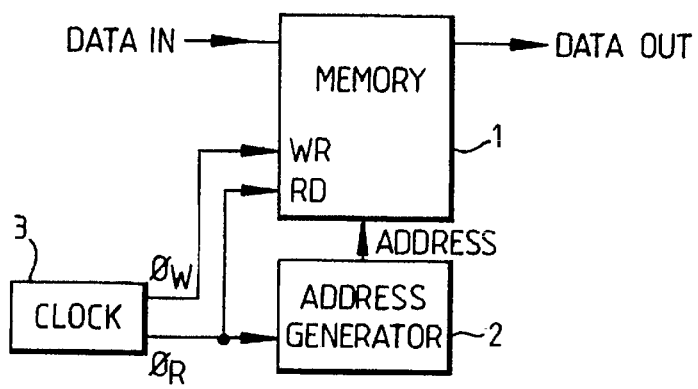
*Fig. 1.*
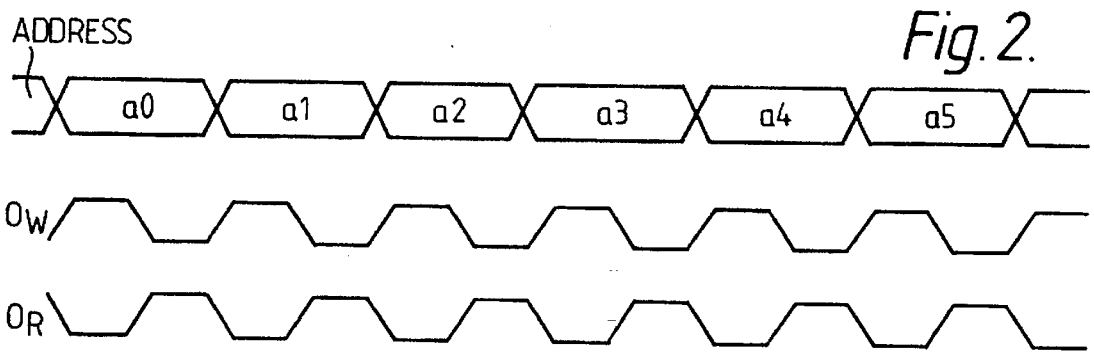
*Fig. 2.*
*Fig. 3.*
| ADDRESS | a0 | a1 | a2 | a3 | a4 | a5 | a6 | a7 | a8 | a9 | a10 | a11 | a12 | a13 | a14 | a15 |
|---|---|---|---|---|---|---|---|---|---|---|---|---|---|---|---|---|
| CONTENT | Y0 | U0 | Y1 | V0 | Y2 | U2 | Y3 | V2 | Y4 | U4 | Y5 | V4 | Y6 | U6 | Y7 | V6 |

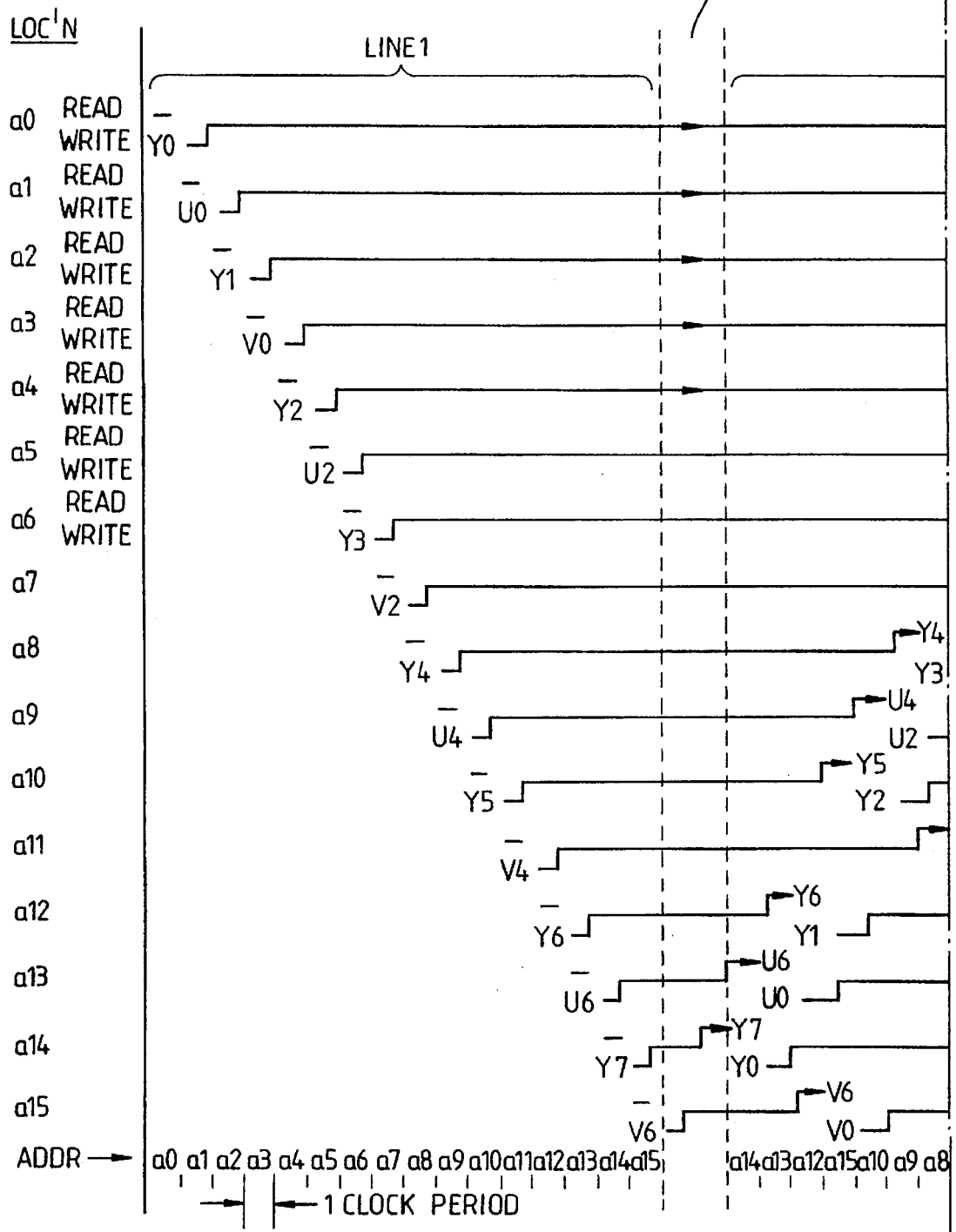

LATERAL IMAGE REVERSAL OF DIGITAL TELEVISION SIGNALS

BACKGROUND OF THE INVENTION

1. Field of the Invention

The present invention concerns a scan reversing unit for video signals. Although not limited thereto, one application of scan reversal is in video telephone or conferencing systems where it is desired to display to the user his own (i.e. the transmitted) picture; it is subjectively more acceptable for this picture to be laterally inverted, because it is this image of himself in a mirror that the user is accustomed to seeing. Although this effect can be achieved on a CRT display simply by reversing the polarity of the line scanning coils, this involves switching of high peak voltages; moreover, reversal can not always be readily implemented on modern solid-state display devices.

2. Description of the Related Art

The invention is concerned with apparatus for processing the video signal so that the resulting signal results in a laterally inverted display on a standard monitor. Previous such apparatus is described in U.S. Pat. No. 4,727,411 and U.S. Pat. No. 4,220,965. It is particularly concerned with video signals in which luminance and chrominance samples are interleaved, where the desired sample sequence is not simply the reverse of the input line.

SUMMARY OF THE INVENTION

Each line of a television signal has a sequence of interleaved luminance and chrominance samples according to a given format ($Y_oU_oY_1V_o$ etc.) which are written into a one line store using a first address sequence and then read out using a second address sequence such that the luminance samples are in reverse order, (and likewise the chrominance); however their interleaving conforms to the given format. The second address sequence is used also for writing in the next incoming line, which is then read out using the first sequence, the two sequences alternating throughout a field period. The technique is especially useful in videotelephony and videoconferencing.

BRIEF DESCRIPTION OF THE DRAWINGS

Some embodiments of the invention will now be described with reference to the accompanying drawings, in which:

FIG. 1 is a block diagram of one form of image reversing unit according to the invention;

FIG. 2 is a timing diagram for the apparatus of FIG. 1;

FIG. 3 shows the contents of the memory 1 of the apparatus of FIG. 1 at the end of the first line of an incoming frame; FIGS. 4a and 4b when placed side-by-side show the occupancy of the above locations at each clock period.

DESCRIPTION OF THE PREFERRED EMBODIMENTS

Figure 4B:
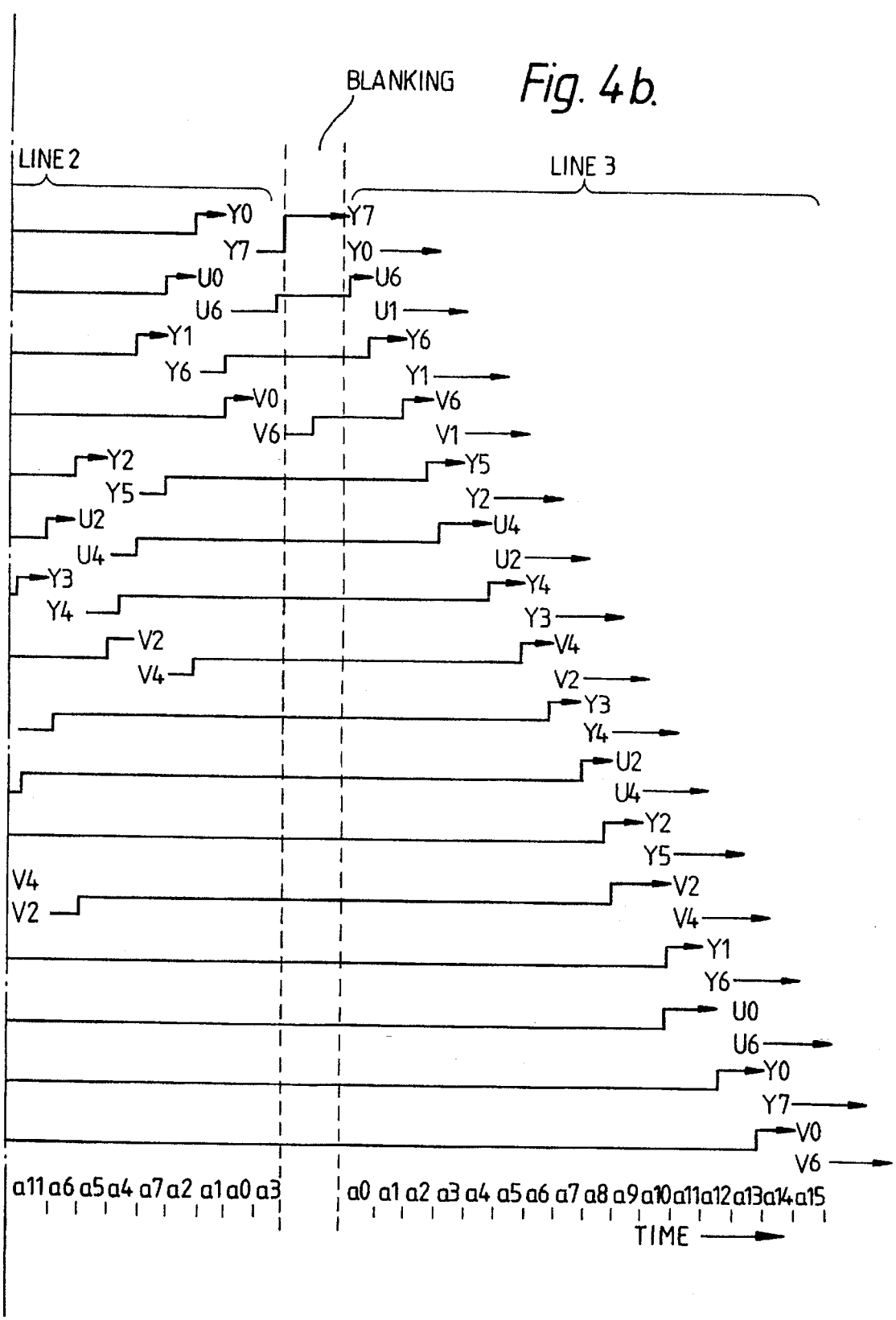

The scan reversal circuit shown in FIG. 1 is, for ease of illustration, designed to process a digital television signal having eight picture elements per line. Any practical system will of course have considerably more elements than this. Each pair of picture elements n, n+1 is represented by respective luminance values Yn, Yn+1 and common chrominance (colour difference) values Un and Vn—i.e. the horizontal chrominance resolution is half that of the luminance.

Each line of the input signal consists of a sequence of sixteen digital valises, in sequence, viz:

Y0 U0 Y1 V0 Y2 U2 Y3 V2 Y4 U4 Y5 V4 Y6 U6 Y7 V6,
followed by a line blanking period.

The main part of the apparatus is a read-write memory 1 having sufficient locations to accommodate an entire line of the picture—i.e. in this example, sixteen locations a0 . . . . a15. Its addresses are provided by an address generator 2, and system timing is provided by two-phase clock generator 3 synchronous with the incoming digital values—i.e. the clock rate is twice the video pixel rate. During each clock period it produces clock pulses $\phi R$ and $\phi W$ during which, respectively, read and write operations to the memory take place.

The object of this arrangement is to write each line into the memory whilst reading out the preceding line in a sequence such that the resulting picture is laterally inverted when viewed. Note that the YUYV format under consideration means that the readout sequence is not the reverse of the write sequence. The resolution of this problem is best appreciated from the following description of the operation of the apparatus. Note that the address sequence produced by the address generator 2 repeats every two lines.

During the first line of a field, the address generator produces addresses a0 to a15 in numerical order, as illustrated by the timing diagram in FIG. 2, and the incoming values Y0, U0, Y1, V0 etc are written in, in the sequence given above, under control of (active low) write clock pulses $\phi W$ during the second half of each clock cycle.

The contents of the memory after the end of the first line are illustrated in FIG. 3.

In order that the scan-reversed line conforms to the format described above (YUYV) the readout sequence needs to be as follows:

Y7 U6 Y6 V6 Y5 U4 Y4 V4 etc and therefore the required address sequence from the address generator 2 is:

a14 a13 a12 a15 a10 a9 a8 a11 etc.

Readout commences at the beginning of the next line period, with readout of value Y7 from location a14, during the first part of the clock period. As soon as one location has been read out, it is possible to write in a digital value for the second line. However, although the obvious way to effect the writing of the second line is to write Y0, U0, Y1, V0 etc into locations in descending numerical order commencing with location a15, this is not possible because that location is not yet free.

It would of course be possible to overcome this difficulty by commencing readout before the conclusion of the line blanking period, but this would necessitate additional buffering to delay the output. In this apparatus, therefore, successive values for the second line are written into the memory locations as they become free—i.e.

Y0 into a14
U0 into a13
Y1 into a12
V0 into a15
and so on.

This permits the use of a single address for both read and write; moreover, as will be seen below, it means that the sequence in which the data for the second line are written in is such that it can be read out in the correct order by addressing the locations in the same order (a0, a1, a2, a3, a4 . . . a15) as in the first line.

FIG. 4 is a diagram showing the occupancy of the store locations at each clock period, over three line periods.

This invention is, as stated above, suitable for incorporation into videotelephone or videoconferencing apparatus. The details of such apparatus are not germane to the present invention, but are discussed in CCITT Standard H261 on Flexible Hardware for P*64 kbit/sec video, and in British Telecom Technology Journal Vol. 8 No. 3 July 1990 pages 28–35 "Video Codec hardware to realise a new World Standard" (M. D. Carr).

Figure 5A:
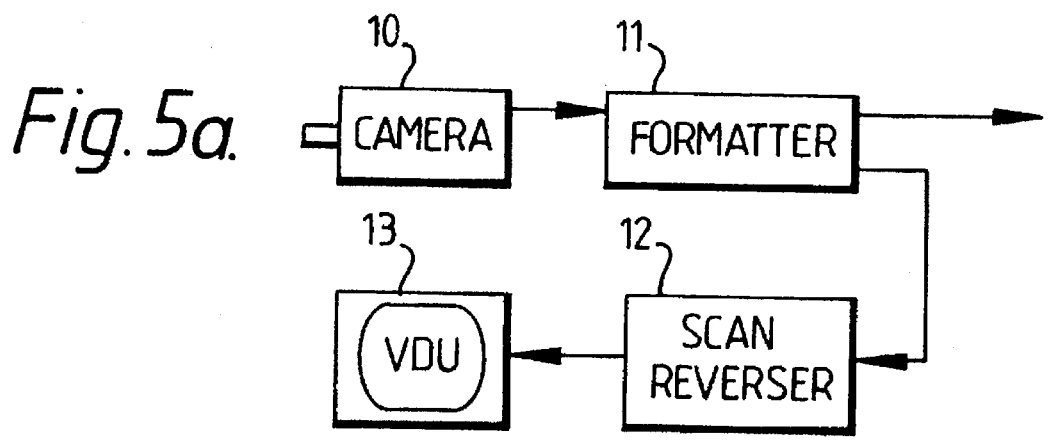
FIGS. 5a and 5b illustrate schematically a user terminal for video communication incorporating the invention.
Figure 5B:
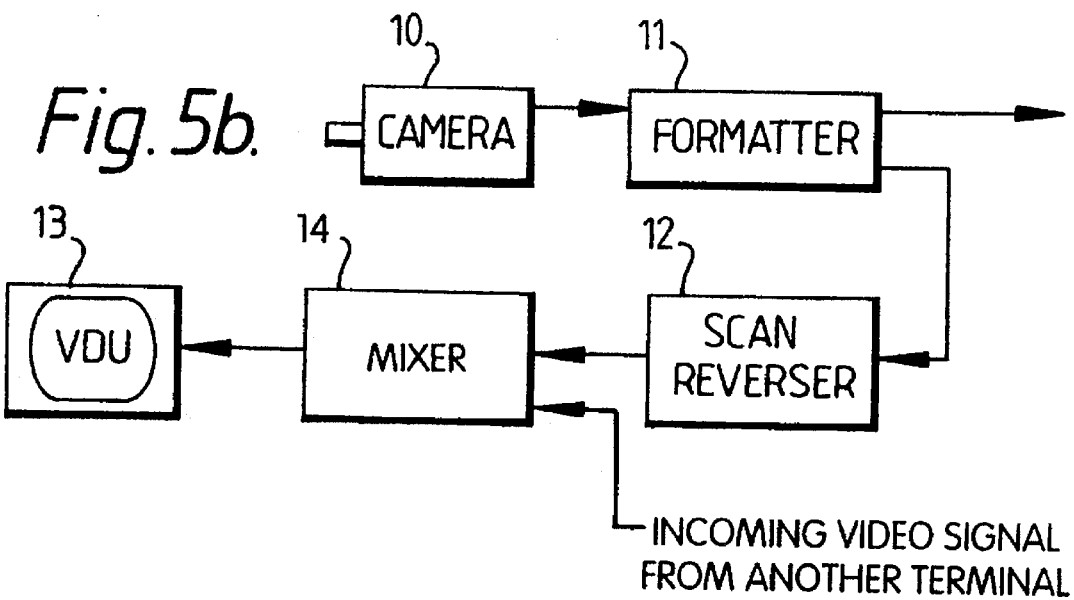

Referring to FIG. 5a, in a user terminal for such applications, the interleaved colour video signal derived from a camera 10 is formatted 11 for transmission into a YUYV format; image-reversed by a unit 12 according to the invention located in the terminal; and displayed on a local monitor VDU 13 within the terminal. Alternatively, as shown in FIG. 5b, it may be mixed, at 14 in conventional fashion, with the incoming video signal from another terminal, to provide an inset picture of the user in the image from the other terminal for display on a single VDU.

I claim:

1. Apparatus for line inversion of an input television signals, each line of which contains a time multiplex sequence of interleaved luminance samples and first and second chrominance samples, said apparatus comprising:

a memory having an address generator arranged to produce during each two-line period first and second address sequences, each one of said sequences being of one television signal line period duration, and read/write control means operable during a first line of the input signal to write the samples of said first line of the input signal, in the order of receipt, into the locations specified by the generated sequence for said first line and, during a subsequent line of the input signal, to read out samples from, and to write the samples of said subsequent line of the input signal, in the order of receipt, into, the locations specified by the generated sequence for said subsequent line, the first and second address sequences being such that the luminance samples are read out in the reverse order from that in which they were received, and that the output first and second chrominance samples, considered separately, are read out in the reverse order from that in which they were received.

2. An apparatus for line inversion according to claim 1 comprising:

terminal user means for providing said input television signal; and means for displaying a reversed image derived from said time multiplex sequence of interleaved luminance samples and said first and second chrominance samples.

3. A method of line-inverting an input television signal each line of which contains a time multiplex sequence of interleaved luminance samples and first and second chrominance samples, said method comprising:

writing a first line of samples into a memory in a first predetermined address sequence;

reading said samples out in a second predetermined address sequence such that (a) output luminance samples are read out in the reverse order from that in which they were received, (b) the output first and second chrominance samples, considered separately, are read out in the reverse order from that in which they were received, and (c) interleaving format of the read-out samples is the same as that of the input signal; and writing the next line of samples into the memory in the second sequence, and reading it out in the first sequence.

4. Apparatus as in claim 1 further comprising:

means for mixing incoming further video signals with reversed image video signals derived from said input time multiplexed sequence of video signals to provide an inset picture of the reversed image video signals within an image of said further video signals on a single video display.

5. A method as in claim 3 further comprising:

mixing incoming further video signals with reversed image video signals derived from said input time multiplexed sequence of video signals; and displaying an inset picture of the reversed image video signals within an image of said further video signals on a single video display.

6. Apparatus for line inversion of a television signal, wherein each line contains a time multiplexed sequence of interleaved luminance, first and second chrominance samples, said apparatus comprising:

means for reading out from a memory the luminance, first and second chrominance samples in a reverse order from that in which they were received such that the read-out format is the same as the input interleaving format; and means for writing the next line of samples into the memory in the sequence in which the first samples were read-out.

7. Apparatus as in claim 6 further comprising:

means for mixing the resulting line inverted television signals with incoming further video signals to provide an inset picture of a reversed line video image within an image of said further video signals.

8. Method for line inversion of a television signal, wherein each line contains a time multiplexed sequence of interleaved luminance, first and second chrominance samples, said method comprising the steps of:

reading out from memory the luminance, first and second chrominance samples in a reverse order from that in which they were received, the read-out format being the same as the input interleaving format; and writing the next line of samples into the memory in the sequence in which the first samples were read-out.

9. A method as in claim 8 further comprising:

mixing the resulting line inverted television signals with incoming further video signals to provide an inset picture of a reversed line video image within an image of said further video signals.

10. Apparatus for line inversion of an input television signal wherein each line contains a time multiplexed sequence of interleaved luminance, first and second chrominance samples, said apparatus comprising:

a read/write memory having addressable storage locations connected to store a complete line of input television signals;

an address generator coupled to said read/write memory and successively providing two different alternating sequences of addresses thereto; and a read/write control signal generator coupled to said read/write memory providing successive read and write signals thereto for each address signal occurrence of the address generator.

11. Apparatus for line inversion of an input television signal wherein each line contains a time multiplexed sequence of interleaved luminance, first and second chrominance samples, said apparatus comprising:

- a read/write memory having addressable storage locations connected to store a complete line of input television signals;
- an address generator coupled to said read/write memory and successively providing two different alternating sequences of addresses thereto;
- a read/write control signal generator coupled to said read/write memory providing successive read and write signals thereto for each address signal occurrence of the address generator;
- a video signal mixer connected to mix the read output video signals from said memory with incoming further video signals thus providing a composite output video signal; and
- a video display connected to display said composite video signal.

12. Method for line inversion of an input television signal wherein each line contains a time multiplexed sequence of interleaved luminance, first and second chrominance samples, said method comprising:

- storing successive lines of said input television signal into addressed storage locations of a digital memory and subsequently reading such stored signals therefrom in an altered sequence;
- successively generating different alternating sequences of address signals and supplying the generated different alternating sequences to said digital memory; and
- during the occurrence of each address signal both (a) reading and outputting a previously stored video signal from the then addressed memory location, and also (b) writing into the same addressed memory location a video signal from the next-occurring line of said input television signal.

13. A method as in claim 12 further comprising:

- mixing the video signals read from said memory with incoming further video signals to provide a composite video signal having an insert picture of a line-inverted video image within an image of said further video signals.

* * * * *